(12) United States Patent
Roh et al.

(10) Patent No.: US 10,426,686 B2
(45) Date of Patent: Oct. 1, 2019

(54) DRIVING MODULE AND MOTION ASSISTANCE APPARATUS INCLUDING THE SAME

(71) Applicant: Samsung Electronics Co., Ltd., Suwon-si, Gyeonggi-do (KR)

(72) Inventors: Se-Gon Roh, Suwon-si (KR); Youn-Baek Lee, Yongin-si (KR); Jeonghun Kim, Hwaseong-si (KR); Minhyung Lee, Seoul (KR); Byungjune Choi, Gunpo-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 660 days.

(21) Appl. No.: 15/171,334

(22) Filed: Jun. 2, 2016

(65) Prior Publication Data

US 2017/0119613 A1    May 4, 2017

(30) Foreign Application Priority Data

Nov. 4, 2015    (KR) .................. 10-2015-0154745

(51) Int. Cl.
*A61H 1/02* (2006.01)
*A61H 3/00* (2006.01)
*B25J 9/00* (2006.01)
*B25J 9/10* (2006.01)

(52) U.S. Cl.
CPC ......... *A61H 1/0262* (2013.01); *A61H 1/0237* (2013.01); *A61H 1/0244* (2013.01); *A61H 1/0255* (2013.01); *A61H 1/0266* (2013.01); *A61H 3/00* (2013.01); *B25J 9/0006* (2013.01); *B25J 9/1045* (2013.01); *A61H 2201/0192* (2013.01); *A61H 2201/1215* (2013.01); *A61H 2201/14* (2013.01); *A61H 2201/1472* (2013.01); *A61H 2201/164* (2013.01); *A61H 2201/165* (2013.01); *A61H 2201/1628* (2013.01); *A61H 2201/5007* (2013.01); *A61H 2201/5015* (2013.01)

(58) Field of Classification Search
CPC ..... B25J 9/0006; B25J 9/1045; A61H 1/0237; A61H 1/0244; A61H 1/0255; A61H 1/0262; A61H 2201/1215; A61H 2201/14; A61H 2201/165; A61H 3/00
See application file for complete search history.

(56) References Cited

U.S. PATENT DOCUMENTS

2012/0271207 A1* 10/2012 Schoen ................ A61F 5/0102
601/34
2014/0190289 A1* 7/2014 Zhu ....................... B25J 9/104
74/89.22

FOREIGN PATENT DOCUMENTS

| CN | 102247260 A | 11/2011 |
| JP | 2001332752 A | 11/2001 |
| JP | 2014073199 A | 4/2014 |
| JP | 2014073222 A | 4/2014 |
| JP | 2014104185 A | 6/2014 |
| KR | 20120082219 A | 7/2012 |

* cited by examiner

*Primary Examiner* — Brian A Dukert
(74) *Attorney, Agent, or Firm* — Harness, Dickey & Pierce, P.L.C.

(57) ABSTRACT

A driving device including a driving source configured to rotate forward or reversely, a first wire and a second wire connected to the driving source, a first joint connected to the first wire to rotate in a moving direction of the first wire, and a second joint connected to the second wire to rotate in a moving direction of the second wire is disclosed.

20 Claims, 8 Drawing Sheets

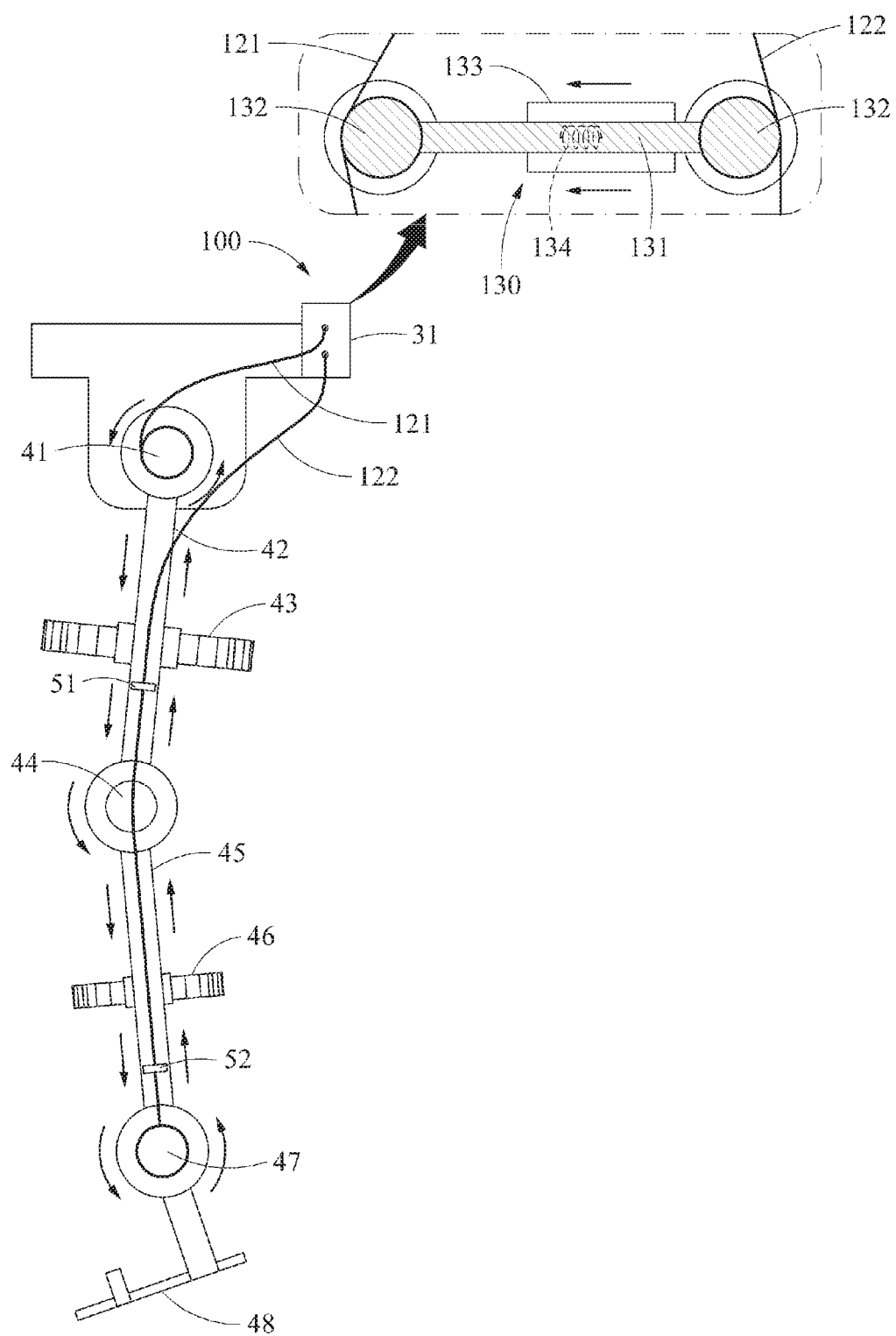

DRIVING MODULE AND MOTION ASSISTANCE APPARATUS INCLUDING THE SAME

CROSS-REFERENCE TO RELATED APPLICATION

This application claims under 35 U.S.C. § 119 to Korean Patent Application No. 10-2015-0154745, filed on Nov. 4, 2015, in the Korean Intellectual Property Office, the entire contents of which are incorporated herein by reference in its entirety.

BACKGROUND

1. Field

At least one example embodiment relates to a driving module and/or a motion assistance apparatus including the driving module.

2. Description of the Related Art

Biped walking may aid a human in performing various daily activities by freeing the hands of the human during walking. When experiencing difficulties in walking, a human body may be exposed to a number of issues. For example, a decrease in muscular strength may restrict physical activities and cause a reduction in muscle mass, energy consumption, and/or metabolism.

Walking assistance robots/walking assistance devices are being developed to aid those people having difficulties in walking to be able to walk with less difficulty. Such robots/devices may be worn on/attached to a lower body of a user to intensify muscular strength and alleviate a burden of supporting their weight during standing or walking on a level ground, a slope, or stairs.

In general, the robots/devices may have a structure to assist motions of joints of a lower body, for example, hip joints, knee joints, and ankle joints using an actuator. In the past, such robots/devices were developed to assist walking/intensify muscular strength of a patient. However, recently, the robots/devices are being developed to improve walking abilities for military purposes, manufacturing purposes, and general walking assistance purposes.

For example, to transmit a force and a torque generated by the actuator to joints of a user, a wearable portion acting as an interface between joints of the user and the device may attach to or enclose a body of the user. When driving power is transmitted in a direction in which a joint portion of the device connected to the wearable portion matches a moving direction of the joint of the user, the force and the torque may be applied appropriately without causing inconvenience. A driving source may include a motor and a decelerator, and may be disposed at a position corresponding to a rotation axis of the joint of the user. The wearable portion may be provided in a form of a belt or a band so that a frame connected to the driving source may be attached to a leg portion of the user. Such a structure may be an external skeleton structure in which the driving source and the wearable portion are relatively thick, and may be worn over clothing to be exposed to an outside.

SUMMARY

Some example embodiments relate to a driving device.

In some example embodiments, the driving device includes a driving source configured to rotate in a first direction and a second direction, the second direction being opposite the first direction; a first wire and a second wire connected to the driving source; a first joint connected to the first wire, the first joint configured to rotate in a moving direction of the first wire; and a second joint connected to the second wire, the second joint configured to rotate in a moving direction of the second wire.

In some example embodiments, the driving device further includes a blocking device configured to selectively increase a tensile force applied to one of the first wire and the second wire.

In some example embodiments, the blocking device comprises: a moving body configured to move along a moving path to apply a pressure to one of the first wire and the second wire; and a guide configured to move the moving body along the moving path.

In some example embodiments, the moving body comprises: a main body; and push bars fixed to both ends of the main body, the push bars configured to contact the first wire and the second wire.

In some example embodiments, the push bars are each configured to accept one of the first wire and the second wire via a grove therein.

In some example embodiments, the push bars are pulleys that are rotatably attached to the main body.

In some example embodiments, a distance between the push bars is greater than a distance between the first wire and the second wire.

In some example embodiments, the blocking device further comprises: a spring configured to provide a restoring force in a direction opposite the tensile force.

In some example embodiments, the driving source comprises: a driving motor; a decelerating gear set connected to the driving motor; and a rotary body connected to an output end of the decelerating gear set, the rotary body having one or more start points on a circumferential surface thereon connected to the first wire and the second wire.

In some example embodiments, the rotary body is configured to pull a pulled one of the first wire and the second wire when the rotary body rotates, and when the rotary body pulls the pulled one of the first wire and the second wire, the moving body is configured to translationally move along the guide such that the moving body provides a tensile force to a non-pulled one of the first wire and the second wire.

In some example embodiments, the pulled one of the first wire and the second wire is configured to rotate a first one of the first joint and the second joint, and the non-pulled one of the first wire and the second wire is configured to rotate a second one of the first joint and the second joint.

Some example embodiments relate to a motion assistance apparatus.

In some example embodiments, the motion assistance apparatus includes a fixing device configured to attach to a first portion of a body of a user; a driving device including a driving source configured to generate forces by rotating in a first direction a d a second direction, two wires extending in opposite directions from the driving source to a respective one of two joints; and a support configured to move a second portion of the body of the user in response to the forces generated by the driving device.

In some example embodiments, the joints include a first joint and a second joint, the support includes a first support extending from the first joint and a second support extending from the second joint such that the first joint is configured to rotate the first support and the second joint is configured to rotate the second support.

In some example embodiments, the motion assistance apparatus further includes a blocking device configured to selectively increase a tensile force applied to one of the two wires.

In some example embodiments, the blocking device comprises: a moving body configured to move along a moving path to apply a pressure to one of the two wires; a guide configured to move the moving body along the moving path; and a spring configured to provide a restoring force to the moving body to move the moving body in a direction opposite the tensile force.

In some example embodiments, the moving body comprises: a main body and push bars fixed to both ends of the main body, the push bars configured to contact the two wires, the push bars being separated by a distance greater than a distance between the two wires.

In some example embodiments, the driving source is configured to pull a first one of the two wires and loosen a second one of the two wires, and when the driving source pulls the first one of the two wires, the moving body is configured to translationally move along the guide such that the moving body provides a tensile force to the second one of the two wires.

In some example embodiments, the first joint corresponds to a hip joint of the user, and the second joint corresponds to an ankle joint of the user, the first support is rotatably connected between the first joint and a knee joint of the user such that the first support is configured to support a thigh of the user, and the second support is rotatably connected between the knee joint and the second joint such that the second support is configured to support a lower leg of the user.

In some example embodiments, when the driving device operates, the first support is configured to allow the user to freely move the knee joint, and the second support is configured to assist the user to move the ankle joint.

In some example embodiments, the two wires includes a first wire connected to the first joint and a second wire connected to the second joint, when the driving source pulls the first wire, the second wire is configured to loosen to lift the thigh of the user and bend the ankle joint of the user, and when the driving source pulls the second wire, the first wire is configured to loosen to stretch the ankle joint of the user and lower the thigh of the user toward a ground.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIGS. 7 and 8 illustrate still another example of a motion assistance apparatus according to at least one example embodiment.

DETAILED DESCRIPTION

Figure 1:
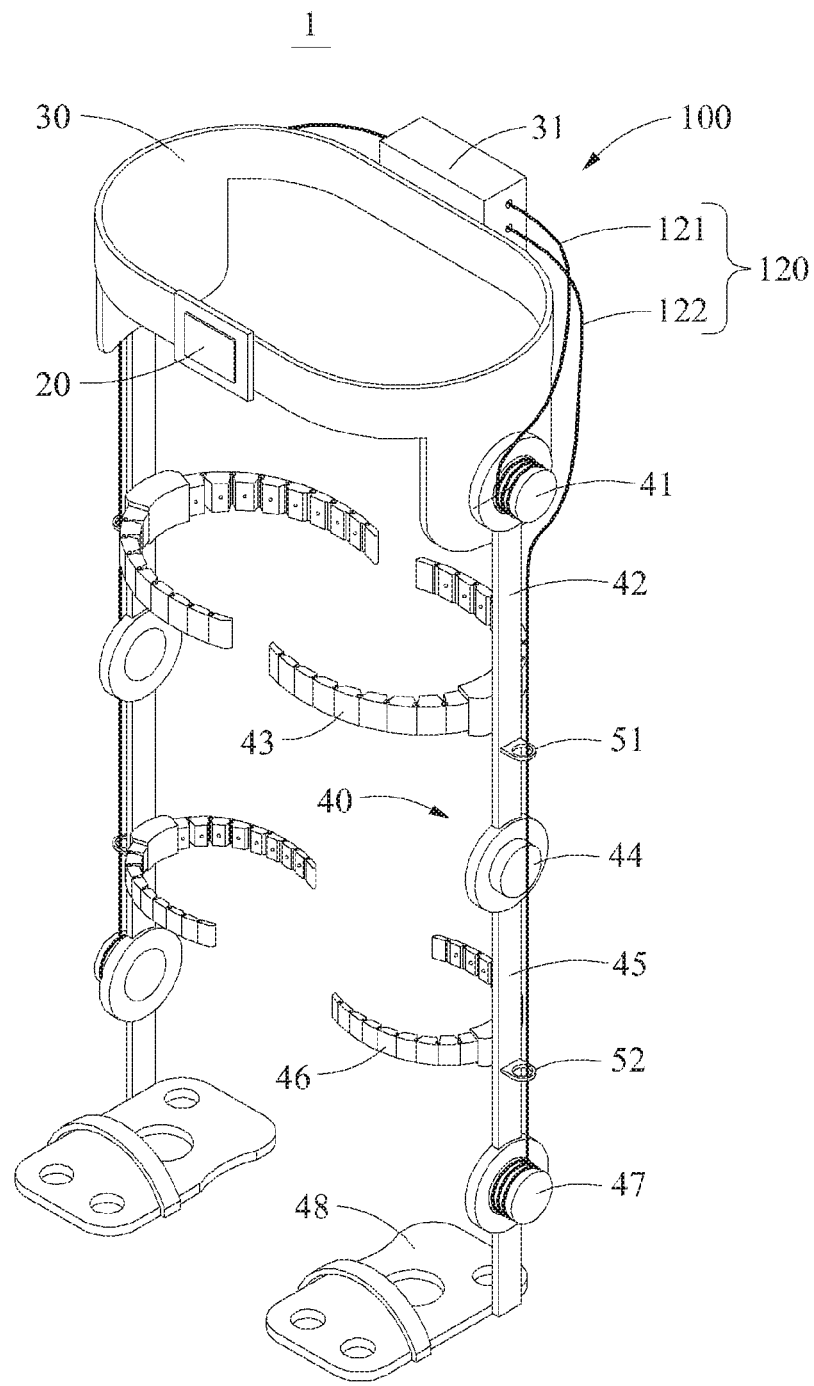
FIG. 1 illustrates an example of a motion assistance apparatus including a driving module according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Various example embodiments will now be described more fully with reference to the accompanying drawings in which some example embodiments are shown. In the drawings, the thicknesses of layers and regions are exaggerated for clarity.

Figure 2:
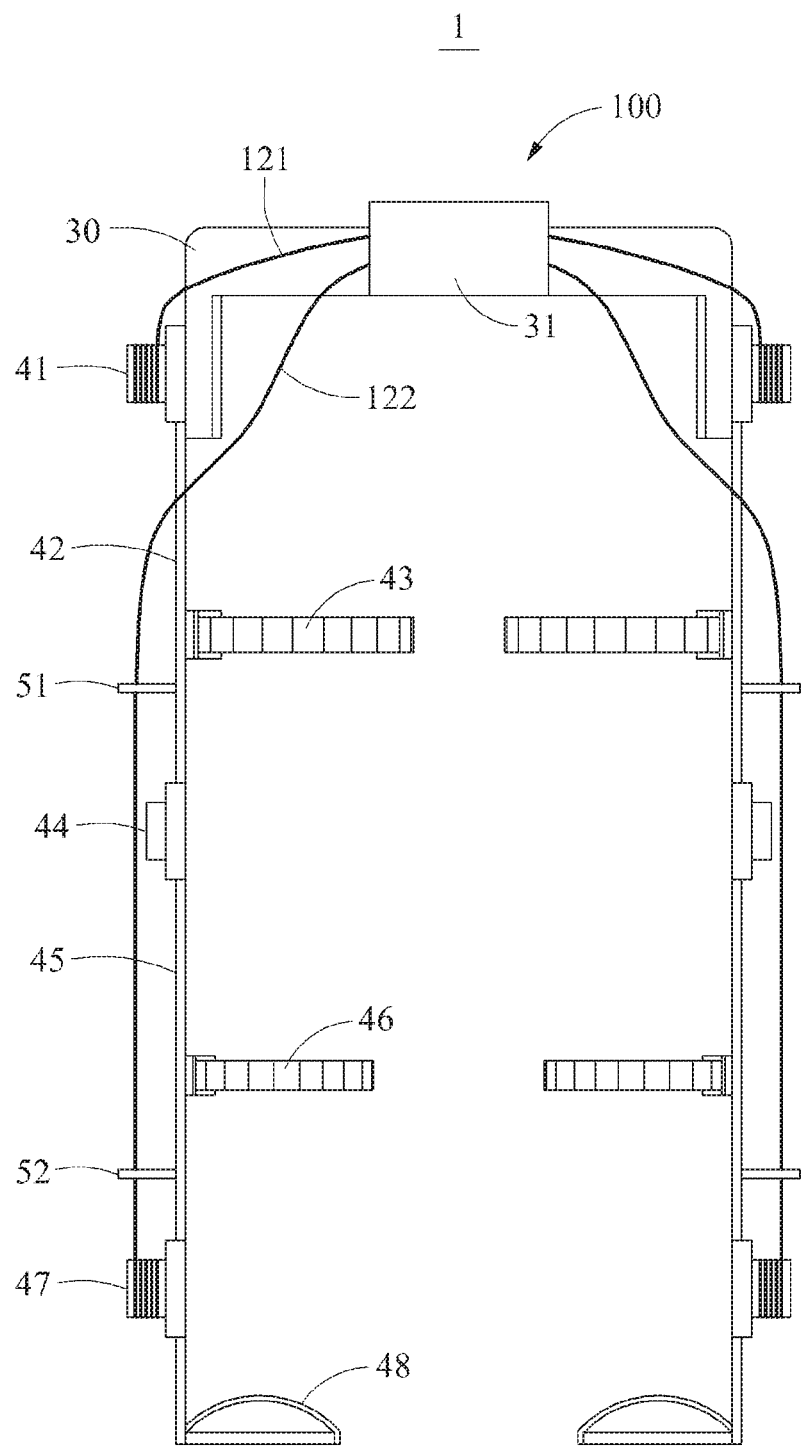
FIG. 2 illustrates another example of a motion assistance apparatus including a driving module according to at least one example embodiment.

FIG. 1 illustrates a motion assistance apparatus including a driving module. FIG. 2 is a rear view of a motion assistance apparatus.

Referring to FIGS. 1 and 2, a motion assistance apparatus 1 may include a fixing module 30, a supporting module 40, a driving module 100, and a controller 20 configured to control the driving module 100.

The driving module 100 may be based on a mechanism for controlling two joints with one motor by applying a concept of a transmission and a clutch configured to control a wire operation to a wire-based driver.

The user may be, for example, a human, an animal, or a robot. However, example embodiments are not limited thereto. Although FIG. 1 illustrates a case in which the motion assistance apparatus 1 assists a motion of a thigh of the user, the motion assistance apparatus 1 may assist a motion of another part of an upper body, for example, a hand, an upper arm, and a lower arm of the user, or a motion of another part of a lower body, for example, a foot, and a calf of the user. Thus, the motion assistance apparatus 1 may assist a motion of a part of the user.

The driving module 100 may include a driving source 110 (see FIG. 3) configured to rotate forward or reversely, a first wire 121 connected to one end of the driving source 110, a second wire 122 connected to another end of the driving source 110, and a first joint and a second joint connected to the first wire 121 and the second wire 122, respectively. Each of the first joint and the second joint may be connected to a joint of the supporting module 40.

The driving module 100 may be disposed on a hip joint of a user to drive a joint portion of the motion assistance apparatus 1. Two driving modules 100 may be disposed on left and right hip joints of the user to assist rotary motions of the left and right hip joints, respectively. The driving module 100 will be also described later.

The fixing module 30 may be attached to the user. The fixing module 30 may be in contact with at least a portion of an outer surface of the user, and may be provided to cover the outer surface of the user. The fixing module 30 may include a curved surface to be in contact with the user. For example, the fixing module 30 may be attached to one side of a waist of the user.

The supporting module 40 may include a hip-joint joint 41 disposed on a hip-joint part and connected to the fixing module 30, a first supporting frame 42 having an upper end connected to the hip-joint joint 41 and configured to support a thigh along a side surface of the thigh, a knee joint 44 connected to a lower end of the first supporting frame 42, a second supporting frame 45 having an upper end connected to the knee joint 44, an ankle joint 47 connected to a lower end of the second supporting frame 46, and a foot supporter 48 rotatably connected to the ankle joint 47.

The hip-joint joint 41 may be disposed on a side surface of the fixing module 30 close to a hip-joint of a user. When the hip-joint joint 41 rotates, in conjunction with the rotating, the first supporting frame 42 may rotate in the same direction as a moving direction of the hip-joint joint 41. The knee joint 44 may be disposed close to a side surface of a knee of the user. When the knee joint 44 rotates, in conjunction with the rotating, the second supporting frame 45 may rotate in the same direction as a moving direction of the knee joint 44.

The ankle joint 47 may be disposed close to a side surface of an ankle of the user. When the ankle joint 47 rotates, the foot supporter 48 may rotate in conjunction with the rotating of the ankle joint 47. In this example, the ankle joint 47 may be rotated by the second wire 122.

Pressurizing members 43 and 46 may include a thigh pressurizing member 43 fixed to the first supporting frame 42 and a calf pressurizing member 46 fixed to the second supporting frame 45. The pressurizing members 43 and 46 may be configured to pressurize the thigh and the calf by a spreading or pressing-together motion, respectively. The pressurizing members 43 and 46 may adjust a size of the spreading or pressing-together motion to pressurize the thigh or the calf of the user.

A battery and the controller 20 may be disposed on a front side of the fixing module 30. The driving module 100 and a case 31 configured to cover the driving module 100 may be disposed on a rear side of the fixing module 30. The first wire 121 and the second wire 122 may come out of both side surfaces of the case 31. The first wire 121 and the second wire 122 may extend along a front side and a rear side of the supporting module 40.

The controller 20 may include a processor and a memory (not shown).

The memory may be a non-volatile memory, a volatile memory, a hard disk, an optical disk, and a combination of two or more of the above-mentioned devices. The memory may be a non-transitory computer readable medium. The non-transitory computer-readable media may also be a distributed network, an that the program instructions are stored and executed in a distributed fashion. The non-volatile memory may be a Read Only Memory (ROM), a Programmable Read Only Memory (PROM), an Erasable Programmable Read Only Memory (EPROM), or a flash memory. The volatile memory may be a Random Access Memory (RAM).

The processor may be implemented by at least one semiconductor chip disposed on a printed circuit board. The processor may be an arithmetic logic unit, a digital signal processor, a microcomputer, a field programmable array, a programmable logic unit, a microprocessor or any other device capable of responding to and executing instructions in a defined manner.

The processor may be programmed with instructions that configure the processor into a special purpose computer to control a driving motor included in the driving module 100 to rotate the driving source 110 such that one or more of the first wire 121 and the second wire 122 move to couple a rotation of a hip-joint joint 41 and a rotation of an ankle joint 47.

The second wire 122 may extend from a rear side of the fixing module 30 to the ankle joint 47. Clips 51 and 52 may be attached to the first supporting frame 42 and/or the second supporting frame 45 to secure the second wire 122 based on a length of the supporting module 40. The clips 51 and 52 may include a first clip 51 fixed to a rear side of the first supporting frame 42 and a second clip 52 fixed to a rear side of the second supporting frame 45. The second wire 122 may extend from the case 31 and pass through the clips 51 and 52 so as to be connected to the ankle joint 47.

The first wire 121 of the driving module 100 may be connected to the hip-joint joint 41, and the second wire 122 may be connected to the ankle joint 47. Since the first wire 121 may be connected to a front portion of the hip-joint joint 41 and the second wire 122 may be connected to a rear portion of the ankle joint 47, the first wire 121 may be disposed opposite to a position of the second wire 122.

A torque generated from the driving module 100 may be transmitted to the supporting module 40. The torque transmitted through the supporting module 40 may be used to lift an entire leg of the user through the pressurizing members 43 and 46, thereby assisting a motion of the user. An operation of the driving module 100 will be also described later.

Figure 3:
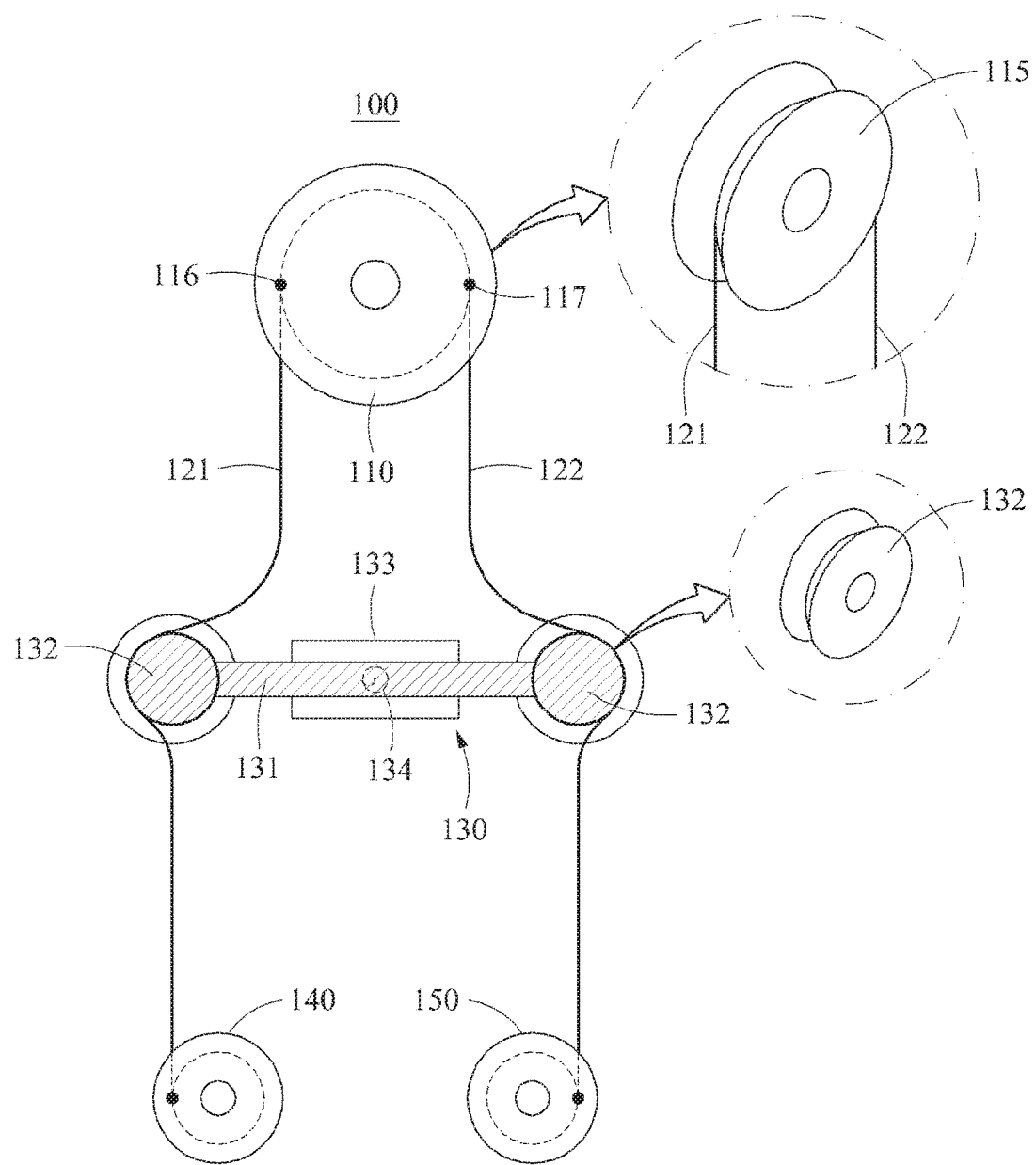
FIGS. 3 and 4 illustrate an example of a driving module according to at least one example embodiment.
Figure 4:
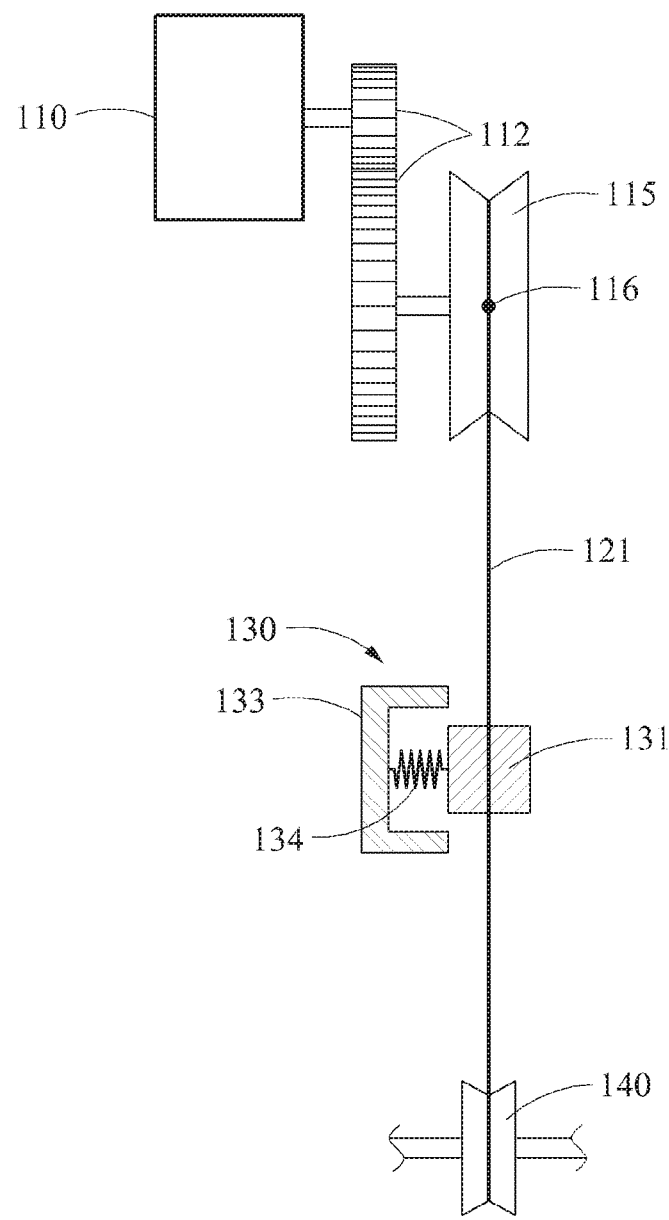

FIG. 3 illustrates the driving module and FIG. 4 is a side view illustrating an example of the driving module including the driving source.

Referring to FIGS. 3 and 4, the driving module 100 may include the driving source 110 configured to provide a driving power, a wire connected to both sides of the driving source 110 and including, for example, the first wire 121 and the second wire 122, a first joint 140 connected to the first wire 121 and configured to rotate in a moving direction of the first wire 121, and a second joint 150 connected to the second wire 122 and configured to rotate in an opposite direction to a rotation direction of the first joint 140.

In some example embodiments, the wire 121, 122 may be two distinct wires, such that the first wire 121 may be connected to one end of the driving source 110 by a first start point 116, and the second wire 122 may be connected to another end of the driving source 110 by a second start point 117. In this case, the first start point 116 and the second start point 117 may be located on both sides of the driving source 110 in an equilibrium state.

In other example embodiments, the wire 121, 122 may be a single wire, such that one start point may be provided in lieu of the first start point 116 and the second start point 117. In this case, the one start point may be located at an upper end of the driving source 110 in the equilibrium state.

The first start point 116 and the second start point 117 may be located on a circumferential surface of the driving source 110. When the driving source 110 rotates in a disequilibrium state, the first start point 116 and the second start point 117 may rotate in conjunction with the rotating of the driving source 110.

A blocking device 130 may be disposed between the first wire 121 and the second wire 122 to selectively increase a tensile force of the first vine 121 and/or the second wire 122. The blocking device 130 may be disposed at a lower end of the driving source 110, and disposed perpendicular to a longitudinal direction of the first wire 121 or the second wire 122.

The blocking device 130 may include a moving body configured to apply a pressure to at least one of the first wire 121 and the second wire 122, and a guide 133 configured to provide a moving path of the moving body. The moving body may include a main body 131 and a push bar 132 configured to directly contact to the first wire 121 and/or the second wire 122 and fixed to both ends of the main body 131.

The push bar 132 may be non-rotatably attached to the main body 131 or integrally formed with the main body 131. In this example, since the push bar 132 does not rotate or move, a frictional force may be generated between the push bar 132 and one or more of the first wire 121 and the second wire 122. Thus, the push bar 132 may readily transmit the tensile force to the first wire 121 or the second wire 122.

The push bar 132 may include a groove to accept the first wire 121 or the second wire 122. The groove may be configured to prevent separation of the first wire 121 and/or the second wire 122 from the push bar 132. In an example, the push bar 132 may also be provided in a form of pulley rotatably fixed to the main body 131. The push bar 132 provided in the form of pulley may provide the tensile force to the first wire 121 and/or the second wire 122 and allow the first wire 121 and/or the second wire 122 to move smoothly.

A distance between two push bars 132 fixed to both sides of the main body 131 may be greater than a minimum distance perpendicularly connecting the first wire 121 and the second wire 122. Thus, in the equilibrium state as illustrated in FIG. 3, the push bars 132 may push the first wire 121 and the second wire 122, and provide a desired intensity of tensile force to the first wire 121 and the second wire 122.

When the guide 133 is excessively long, the push bar 132 may move restrictedly and a movable distance of the push bar 132 may be reduced. When the push bar 132 moves restrictedly, the tensile force may be insufficiently provided to the wire. Thus, a length of the guide 133 may be, for example, less than a length of twice a length of the push bar 132 minus a distance between the first wire 121 and the second wire 122.

The blocking device 130 may further include a spring 134 configured to connect the guide 133 and the main body 131 and provide a restoring force. When the moving body is biased leftward or rightward, the spring 134 may provide the restoring force in an opposite direction to a biased direction.

The first wire 121 may be connected to the first joint 140 rotatable by the first wire 121, and the second wire 122 may be connected to the second joint 150 rotatable by the second wire 122. The first joint 140 and the second joint 150 may be provided in a form of pulley. Also, an end of the first wire 121 and an end of the second wire 122 may be fixed to the first joint 140 and the second joint 150.

In the equilibrium state, the first wire 121 may be provided in a state in which the first wire 121 is wound around a circumferential surface of the first joint 140, and the second wire 122 may be provided in a state in which the second wire 122 is wound around a circumferential surface of the second joint 150. In this example, the first wire 121 and the second wire 122 may be wound in opposite directions.

As illustrated in FIG. 3, when the first wire 121 is fixed on a left side of the first joint 140 and the second wire 122 is fixed to a right side of the second joint 150, the first joint 140 and the second joint 150 may rotate in the same direction in response to a rotation of the driving source 110.

When the first wire 121 is fixed on the left side of the first joint 140 and the second wire 122 is fixed on a left side of the second joint 150, the first joint 140 and the second joint 150 may rotate in opposite directions in response to a rotation of the driving source 110.

Referring to FIG. 4, the driving source 110 may include a driving motor, a decelerating gear set 112 connected to a driving shaft of the driving motor, and a rotary body 115 connected to an output end of the decelerating gear set 112. The first start point 116 and the second start point 117 of the first wire 121 and the second wire 122 may be connected to a circumferential surface of the rotary body 115.

An input end of the decelerating gear set 112 may be connected to the driving motor and an output end of the decelerating gear set 112 may be connected to the rotary body 115. Also, the decelerating gear set 112 may include a plurality of spur gears having different diameters. The diameters of the plurality of spur gears may sequentially increase in an order from a gear connected to the input end to a gear connected to the output end, thereby actualizing a deceleration ratio.

Also, the decelerating gear set 112 may have a harmonic drive structure. In the harmonic drive structure, a central shaft may be connected to the driving motor and a portion corresponding to a flexspline may be connected to the rotary body 115. Also, by adjusting a number of gear teeth of the flexspline and a number of gear teeth of an outermost ring gear, a high deceleration ratio may be achieved.

Figure 5:
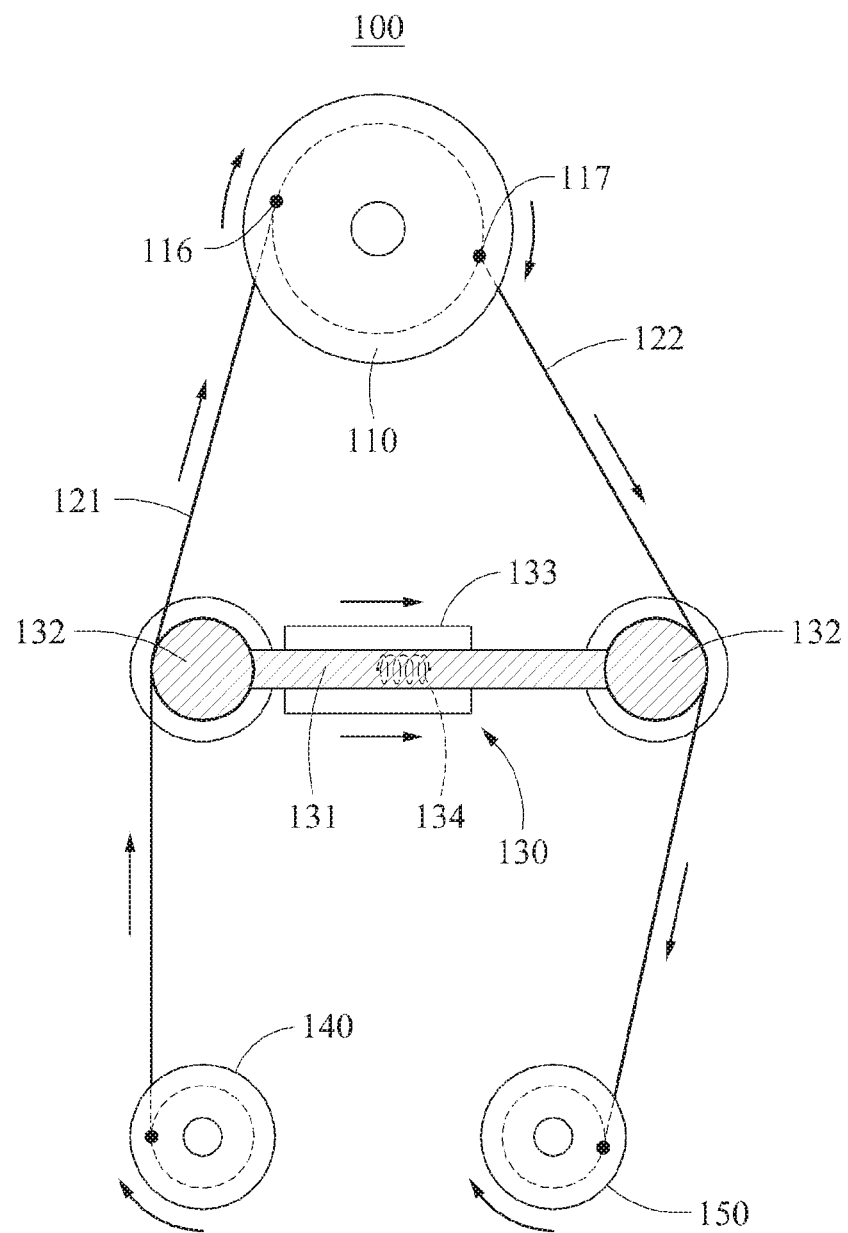
FIGS. 5 and 6 illustrate another example of a driving module according to at least one example embodiment.
Figure 6:
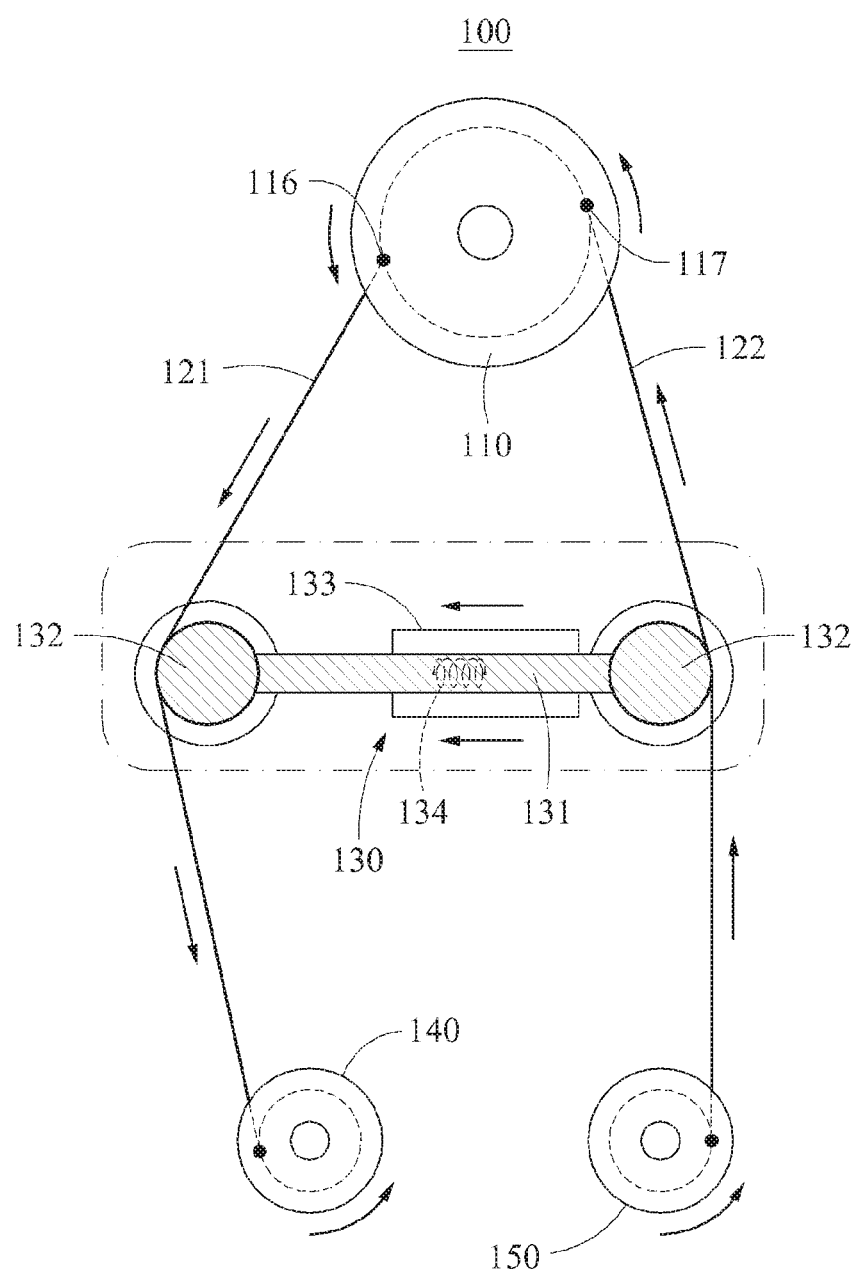

FIG. 5 illustrates the moving body moving when the driving source 110 of the driving module 100 rotates in a clockwise direction. FIG. 6 illustrates the moving body moving when the driving source 110 of the driving module 100 rotates in a counterclockwise direction.

Referring to FIG. 5, when the driving source 110 rotates in the clockwise direction, the first wire 121 may be pulled and a tensile force may be exerted on the first wire 121. If the blocking device 130 was absent, the second wire 122 may not apply a rotation power to the second joint 150 while extending downward in a state in which the tensile force is not applied.

In contrast, in one or more example embodiments, due to the blocking device 130, when the driving source 110 rotates in the clockwise, the first wire 121 may move the moving body of the blocking device 130 toward the second wire 122 such that the push bar 132 of the moving body may provide the tensile force to the second wire 122 to compensate for an unwound portion of the second wire 122. Therefore, the second wire 122 may not loosen even though the driving source 110 rotates. In this example, the second wire 122 may apply the rotation power to the second joint 150.

In FIG. 5, the moving body moving rightward based on a translational movement may desirably push rightward the second wire 122 loosened in response to the rotating of the driving source 110 to be tensed, thereby preventing separation of the second wire 122.

Referring to FIG. 6, when the driving source 110 rotates in the counterclockwise direction, a tensile force may be generated to allow the second wire 122 to be tensed, and the second wire 122 may move the moving body toward the first wire 121. The push bar 132 of the moving body may provide the tensile force to the first wire 121 and compensate for an unwound portion of the first wire 121 such that the first wire 121 is not loosened. In this example, the first wire 121 may apply the rotation power to the first joint 140.

The spring 134 connecting the main body 131 and the guide 133 may apply the restoring force in an opposite direction to a moving direction of the main body 131. Thus, the spring 134 may allow a center of the moving body to return to a center of the guide 133 after the rotating of the driving source 110 terminates.

In FIG. 6, the moving body moving leftward based on the translational movement may desirably push leftward the first wire 121 loosened in response to the rotating of the driving source 110 to be tensed, thereby preventing separation of the first wire 121.

Referring to FIGS. 5 and 6, the first joint 140 and the second joint 150 may rotate in the same direction, and may rotate in an opposite direction to a moving direction of the driving source 110.

Figure 7:
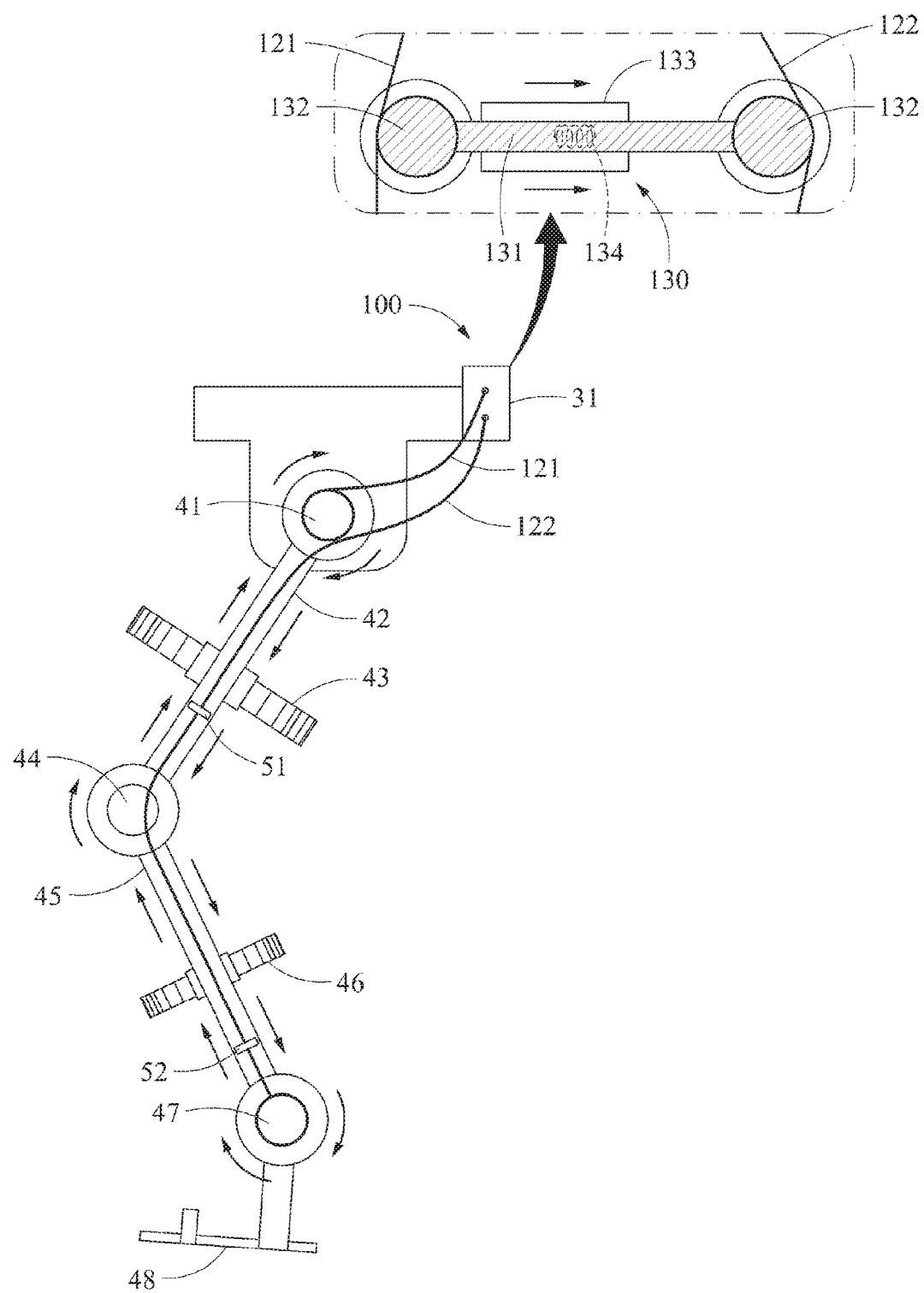

FIGS. 7 and 8 illustrate examples of the driving module 100 applied to the motion assistance apparatus 1. Also, examples of operating the blocking device 130 of the driving module 100 are illustrated in dash-dot boxes of FIGS. 7 and 8.

Referring to FIGS. 7 and 8, as illustrated in FIG. 7, the motion assistance apparatus 1 may operate in connection with a motion of a user lifting a leg to walk when the driving module 100 rotates in the clockwise direction, and, as illustrated in FIG. 8, the motion assistance apparatus 1 may operate in connection with a motion of the user lowering the leg when the driving module 100 rotates in the counterclockwise direction.

The motion assistance apparatus 1 may be configured to couple a rotation of the hip-joint joint 41 with a rotation of the ankle joint 47 so as to operate in conjunction with each other.

The first joint 140 of the driving module 100 may be fixed to the hip-joint joint 41. The first joint 140 may be fixed to an outer side of the hip-joint joint 41, and a rotation of the hip-joint joint 41 may be synchronized with a rotation of the first joint 140.

The knee joint 44 not be connected with the driving module 100 and may freely rotate. When the first supporting frame 42 rotates, the knee joint 44 may also rotate by gravity.

The second joint 150 of the driving module 100 may be fixed to the ankle joint 47. The second joint 150 may be fixed to an outer side of the ankle joint 47, and a rotation of the ankle joint 47 may be synchronized with a rotation of the second joint 150.

Referring to FIG. 7, when the controller 20 instructs the driving source 110 to rotate in the clockwise direction, the hip-joint joint 41 may rotate in the clockwise direction. In this example, the hip-joint joint 41 may allow the first supporting frame 42 to rotate in the clockwise direction while rotating in the clockwise direction. The second supporting frame 45 connected to the knee joint 44 may descend due to the gravity, and rotate in the counterclockwise direction opposite to a direction of the first supporting frame 42.

In this example, the tensile force exerted on the first wire 121 may allow the moving body to move toward the second wire 122 such that the push bar 132 pushes the second wire 122. Through this, the tensile force may be exerted on the second wire 122. The exerted tensile force may tense the second wire 122, thereby allowing the foot joint 47 to rotate. The foot joint 47 may rotate in the clockwise direction similarly to the hip-joint joint 41 such that a front portion of the foot joint 47 is lifted.

Also, the rotation power may be lightly applied to the ankle joint 47 in practice. Thus, a driving power of the driving source 110 may be applied to allow the hip-joint joint 41 to rotate. Through this, the user may move an ankle irrespective of the tensile force of the second wire 122.

Referring to FIG. 8, when the controller 20 instructs the driving source 110 to rotate in the counterclockwise direction, the hip-joint joint 41 may rotate in the counterclockwise direction. In this example, the hip-joint joint 41 may allow the first supporting frame 42 to rotate in the counterclockwise direction while rotating in the counterclockwise direction. Although the second supporting frame 45 connected to the knee joint 44 descends due to the gravity, the second supporting frame 45 may rotate relative to the first supporting frame 42. Thus, the second supporting frame 45 may rotate in the clockwise direction opposite to a direction of the first supporting frame 42.

In this example, the tensile force exerted on the second wire 122 may allow the moving body to move toward the first wire 121 such that the push bar 132 pushes the first wire 121. Through this, the tensile force may be exerted on the second wire 122. The generated tensile force may tense the first wire 121, thereby allowing the hip-joint joint 41 to rotate. The foot joint 47 may rotate in the counterclockwise direction similarly to the hip-joint joint 41 such that the front portion of the foot joint 47 moves downward.

Also, the rotation power may be lightly applied to the hip-joint joint 41 in practice. Thus, the driving power of the driving source 110 may be applied to allow the ankle joint 47 to rotate, and the supporting module 40 may descend due to the gravity. Through this, the user may lower an ankle irrespective of the tensile force of the first wire 121.

As the foregoing, in general, the motion assistance apparatus 1 employing the driving module 100 may operate based on a torque rotating in a direction to lift a leg in lieu of a torque rotating in a direction to lower the leg and thus, may be suitable for such structure of human legs.

Also, a rotary motion of the hip-joint joint 41 in the motion assistance apparatus 1 may be performed with a relatively large power consumption. In contrast, a rotation of the knee joint 44 or the ankle joint 47 may be a joint motion in an idle state using little power, for example, a passive movement. Thus, the driving module 100 of the motion assistance apparatus 1 may be operated appropriately.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A driving device comprising:
   a driving source configured to rotate in a first direction and a second direction, the second direction being opposite the first direction;
   a first wire and a second wire connected to the driving source;
   a first joint connected to the first wire and not the second wire, the first joint corresponding to one joint of a limb of a user, the first joint configured to rotate in a moving direction of the first wire; and
   a second joint connected to the second wire and not the first wire, the second joint corresponding to another joint of the limb of the user, the second joint configured to rotate in the moving direction of the second wire.
2. The driving device of claim 1, further comprising:
   a blocking device configured to selectively increase a tensile force applied to one of the first wire and the second wire in response to movement of another one of the first wire and the second wire.
3. The driving device of claim 2, wherein the blocking device comprises:
   a moving body configured to move along a moving path to apply a pressure to one of the first wire and the second wire; and
   a guide configured to move the moving body along the moving path.
4. The driving device of claim 3, wherein the moving body comprises:
   a main body; and
   push bars fixed to both ends of the main body, the push bars configured to contact the first wire and the second wire.
5. The driving device of claim 4, wherein the push bars are each configured to accept one of the first wire and the second wire via a grove therein.
6. The driving device of claim 5, wherein the push bars are pulleys that are rotatably attached to the main body.
7. The driving device of claim 5, wherein a distance between the push bars is greater than a distance between the first wire and the second wire.
8. The driving device of claim 4, wherein the blocking device further comprises:
   a spring configured to provide a restoring force in a direction opposite the tensile force.
9. The driving device of claim 3, wherein the driving source comprises:
   a driving motor;
   a decelerating gear set connected to the driving motor; and
   a rotary body connected to an output end of the decelerating gear set, the rotary body having one or more start points on a circumferential surface thereon connected to the first wire and the second wire.

10. The driving device of claim 9, wherein
the rotary body is configured to pull a pulled one of the first wire and the second wire when the rotary body rotates, and
when the rotary body pulls the pulled one of the first wire and the second wire, the moving body is configured to translationally move along the guide such that the moving body provides a tensile force to a non-pulled one of the first wire and the second wire.

11. The driving device of claim 10, wherein
the pulled one of the first wire and the second wire is configured to rotate a first one of the first joint and the second joint, and
the non-pulled one of the first wire and the second wire is configured to rotate a second one of the first joint and the second joint.

12. A motion assistance apparatus comprising:
a fixing device configured to attach to a portion of a body of a user;
a driving device including a driving source configured to generate forces by rotating in a first direction and a second direction, two wires extending in opposite directions from the driving source and two joints connected to respective ones of the two wires, the two joints including a first joint and a second joint associated with respective joints of a limb of the user, the first joint connected to a first wire of the two wires and not a second wire of the two wires, and the second joint connected to the second wire and not the first wire; and
a support configured to move a the limb of the body of the user in response to the forces generated by the driving device.

13. The motion assistance apparatus of claim 12, wherein
the support includes a first support extending from the first joint and a second support extending from the second joint such that the first joint is configured to rotate the first support and the second joint is configured to rotate the second support.

14. The motion assistance apparatus of claim 13, further comprising:
a blocking device configured to selectively increase a tensile force applied to one of the two wires in response to movement of another one of the first wire and the second wire.

15. The motion assistance apparatus of claim 14, wherein the blocking device comprises:

a moving body configured to move along a moving path to apply a pressure to one of the two wires; and
a guide configured to move the moving body along the moving path.

16. The motion assistance apparatus of claim 15, wherein the moving body comprises:
a main body and push bars associated with both ends of the main body, the push bars configured to contact the two wires, the push bars being separated by a distance greater than a distance between the two wires.

17. The motion assistance apparatus of claim 15, wherein
the blocking device further includes a spring configured to provide a restoring force to the moving body to move the moving body in a direction opposite the tensile force,
the driving source is configured to pull a first one of the two wires and loosen a second one of the two wires, and
when the driving source pulls the first one of the two wires, the moving body is configured to translationally move along the guide such that the moving body provides a tensile force to the second one of the two wires.

18. The motion assistance apparatus of claim 17, wherein
the support further comprises a third joint between the first support and the second support, the third joint corresponds to a knee joint of the user,
the first joint corresponds to a hip joint of the user, and the second joint corresponds to an ankle joint of the user,
the first support is rotatably connected between the first joint and the third joint of the user such that the first support is configured to support a thigh of the user, and
the second support is rotatably connected between the third joint and the second joint such that the second support is configured to support a lower leg of the user.

19. The motion assistance apparatus of claim 18, wherein when the driving device operates,
the first support is configured to allow the user to freely move the third joint, and
the second support is configured to assist the user to move the ankle joint.

20. The motion assistance apparatus of claim 19, wherein
when the driving source pulls the first wire, the second wire is configured to loosen to lift the thigh of the user and bend the ankle joint of the user, and
when the driving source pulls the second wire, the first wire is configured to loosen to stretch the ankle joint of the user and lower the thigh of the user toward a ground.

* * * * *